Nov. 15, 1966     J. C. HUBBS     3,286,180
ELECTRICAL MEASURING APPARATUS FOR DETERMINING
RESPONSE TIME OF TRANSISTORS AND THE LIKE
Filed June 22, 1962     10 Sheets-Sheet 1
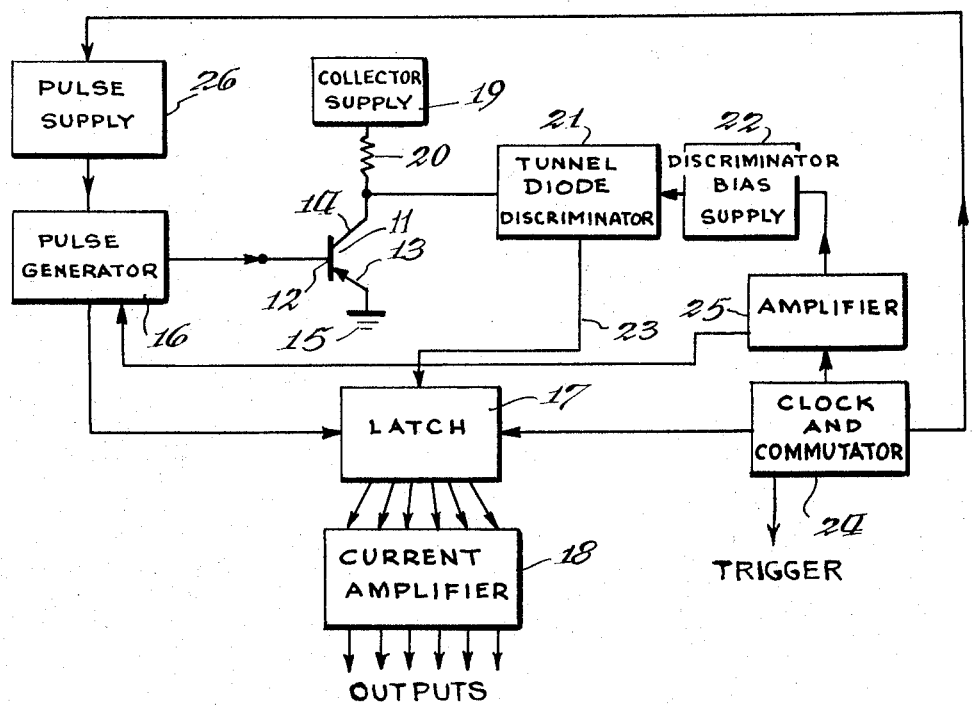
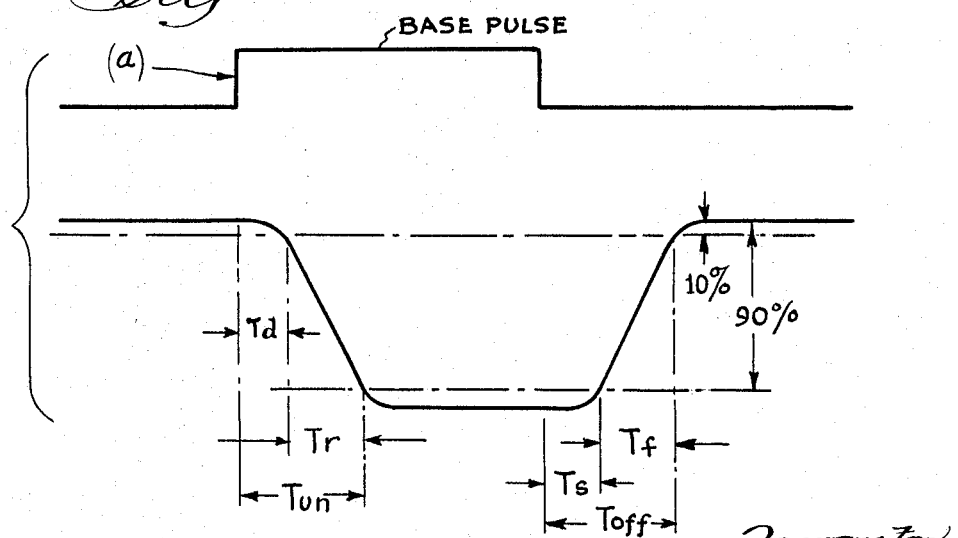
Inventor
John C. Hubbs
By Merriam, Smith & Marshall
Attorneys

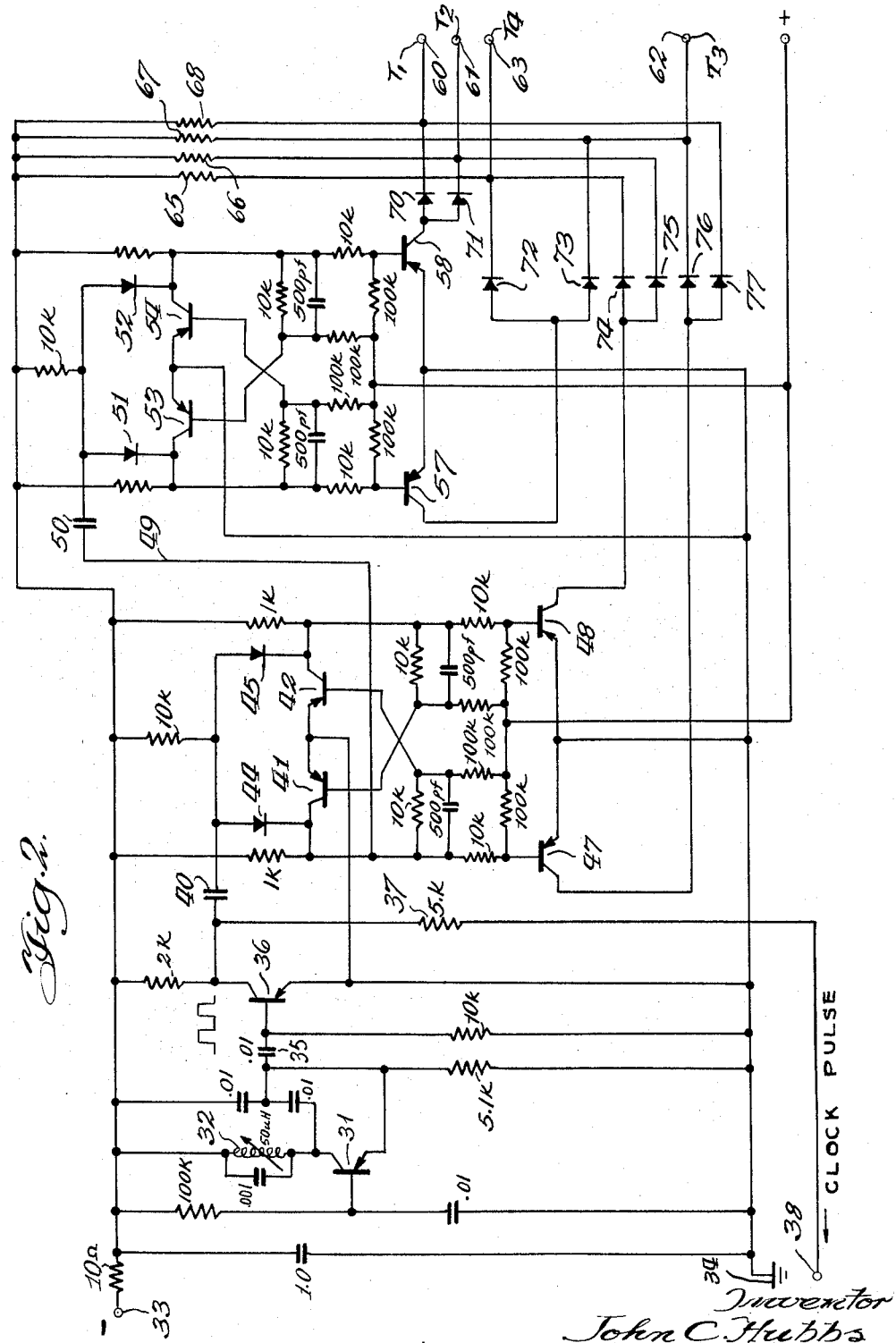

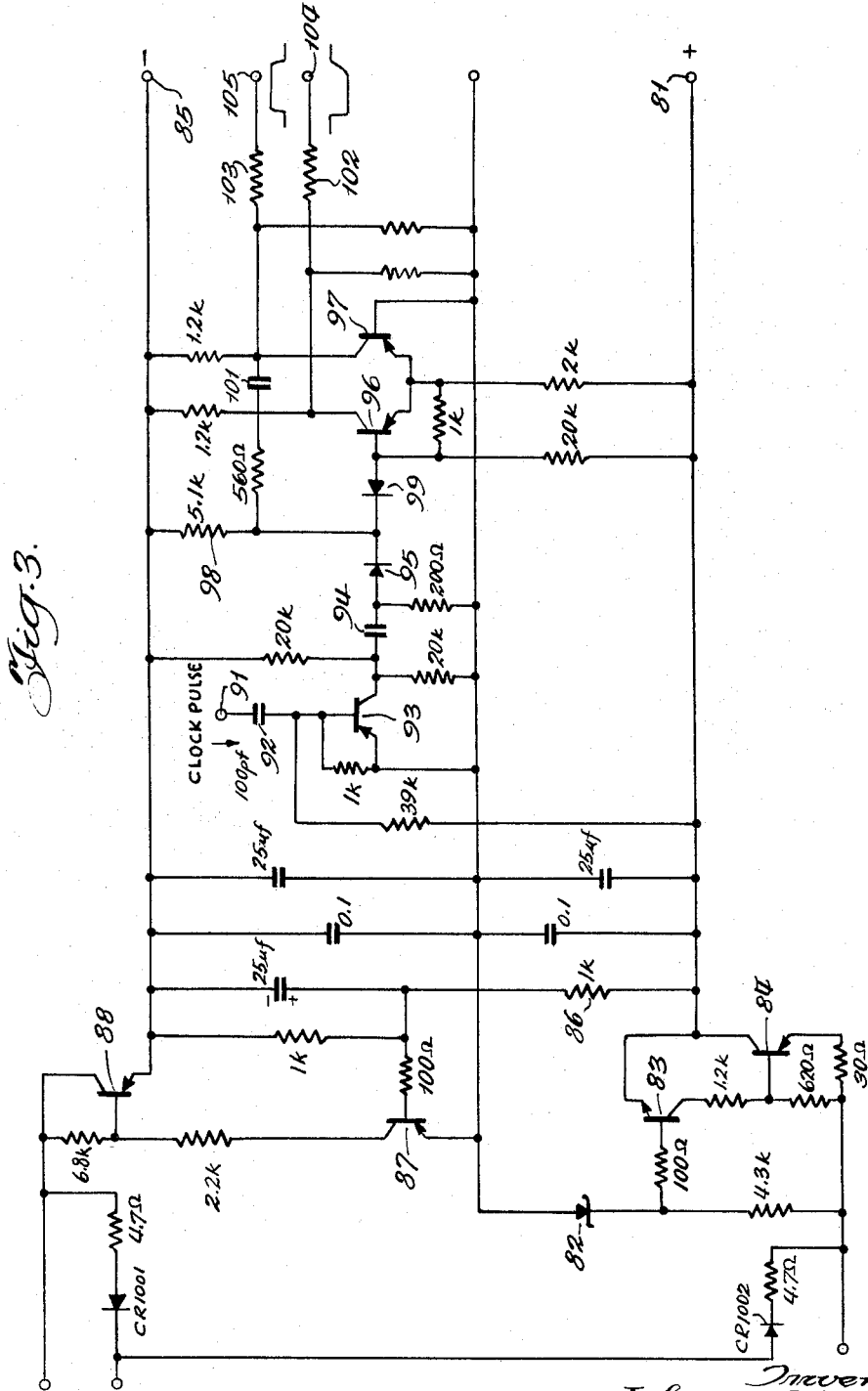

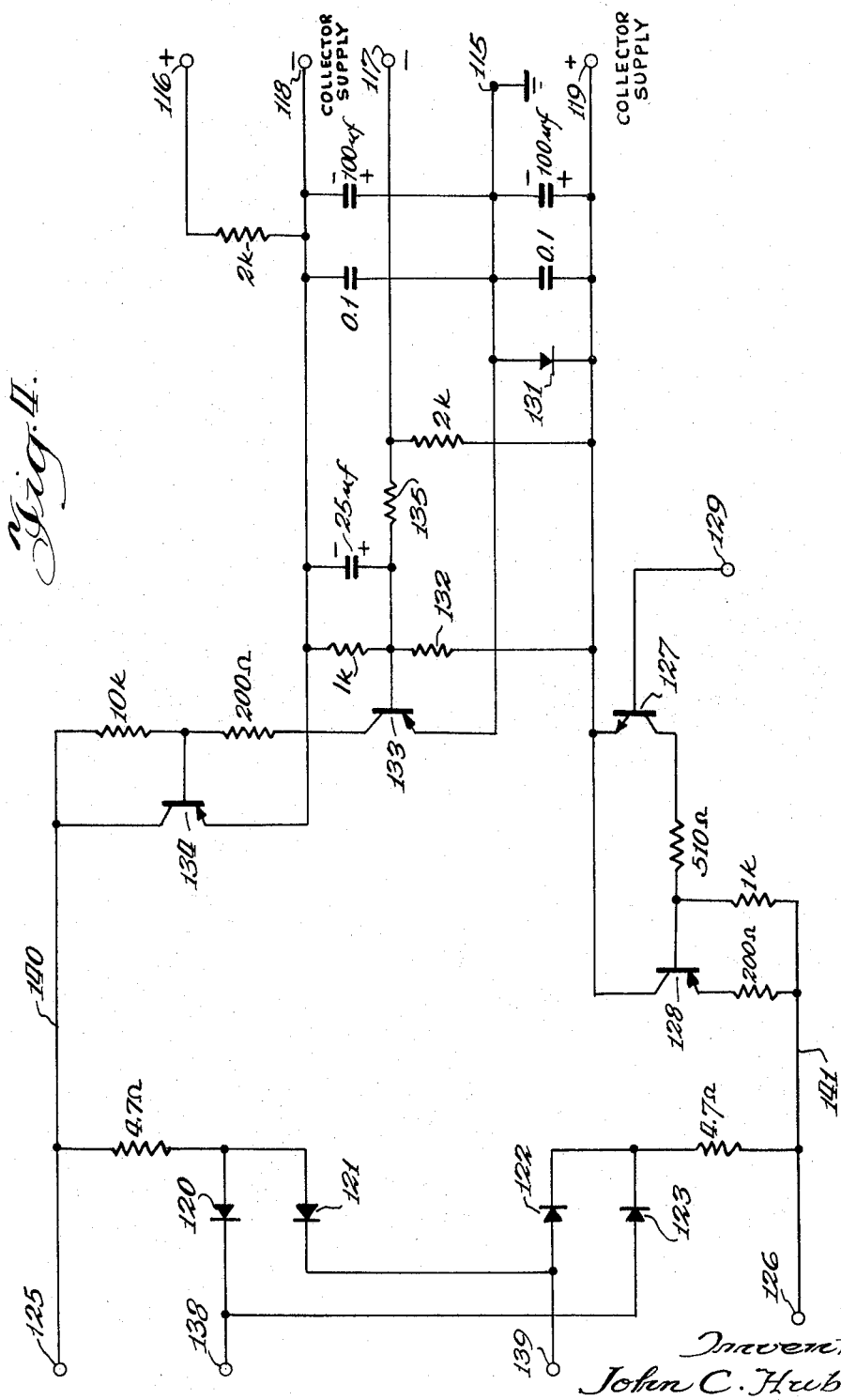

Nov. 15, 1966

J. C. HUBBS  3,286,180

ELECTRICAL MEASURING APPARATUS FOR DETERMINING
RESPONSE TIME OF TRANSISTORS AND THE LIKE

Filed June 22, 1962  10 Sheets-Sheet 5

Fig. 5.

Inventor
John C. Hubbs
By Merriam, Smith & Marshall
Attorneys

Fig. 6.

Inventor
John C. Hubbs
By Merriam, Smith & Marshall
Attorneys

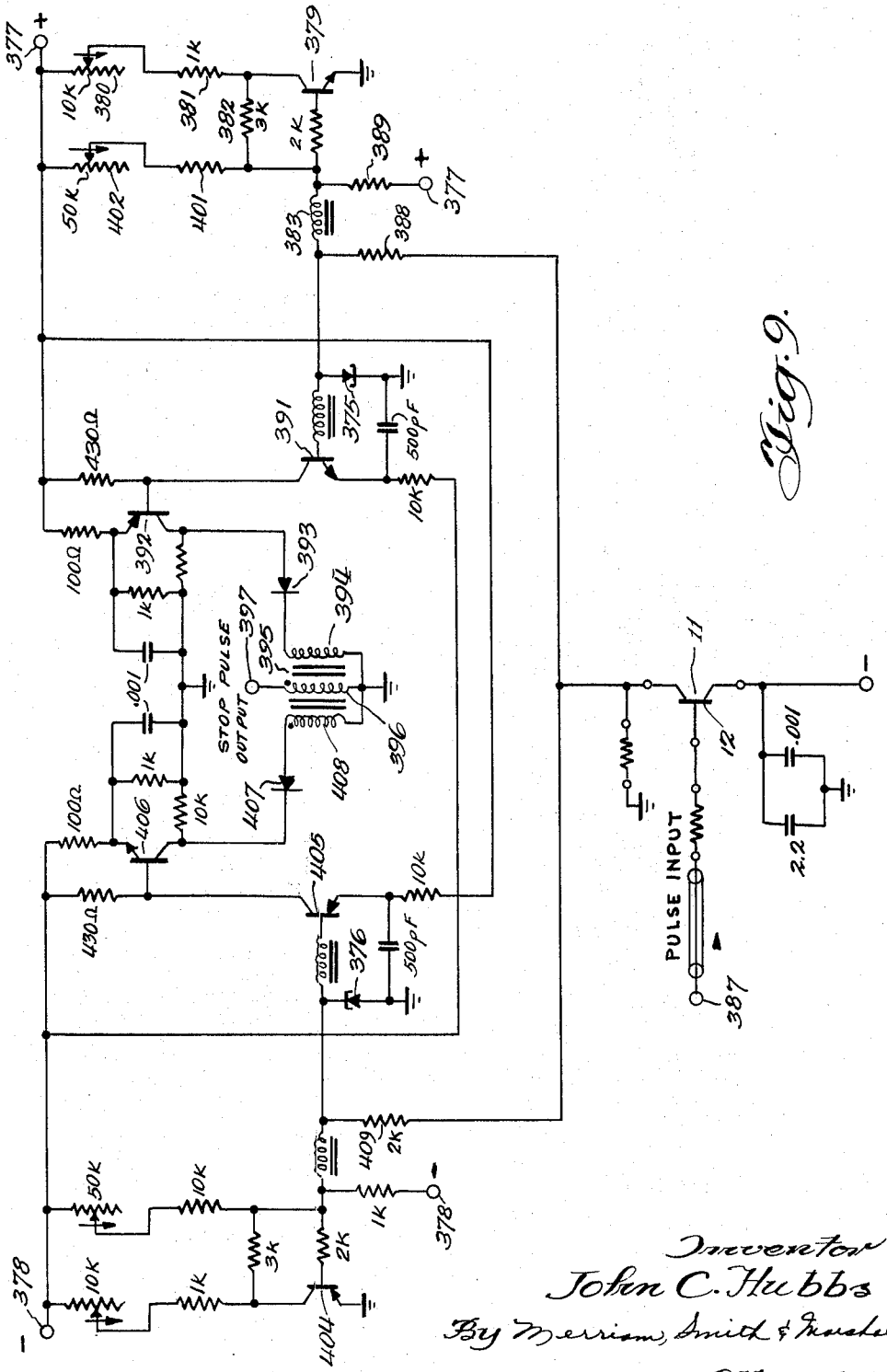

Nov. 15, 1966 J. C. HUBBS 3,286,180
ELECTRICAL MEASURING APPARATUS FOR DETERMINING
RESPONSE TIME OF TRANSISTORS AND THE LIKE
Filed June 22, 1962 10 Sheets-Sheet 10

United States Patent Office 3,286,180
Patented Nov. 15, 1966

3,286,180
ELECTRICAL MEASURING APPARATUS FOR DETERMINING RESPONSE TIME OF TRANSISTORS AND THE LIKE
John C. Hubbs, Oakland, Calif., assignor to E-H Research Laboratories, Inc., Oakland, Calif., a corporation of California
Filed June 22, 1962, Ser. No. 204,477
3 Claims. (Cl. 324—158)

This invention relates to apparatus for determining transient or dynamic characteristics of electrical apparatus. Types of apparatus wherein considerations of such type are significant are those where the delay, the rise, the turn-on, the storage, and the turn-off time periods within which the apparatus responds become significantly important.

The invention herein to be described is directed particularly to apparatus which is designed and constituted for providing time information. It is through such information that accurate and rapid evaluation of the transient or dynamic responses of various components such as transistors, diodes, tunnel diodes, high frequency cables, pulse transformers, delay lines, amplifiers and related high-speed switch components may be ascertained.

The response time of such components as are herein to be considered is extremely fast and usually requires less than approximately 50 millisecond total read-out time within which all of the foregoing conditions shall be determined, observed and measured. The component or device herein set forth is particularly suitable and usable in connection with automatic production line testing methods in which large quantities of components are involved. In addition, the apparatus herein to be described provides a medium whereby various types of circuitry in solid state form can be considered in their design state.

In order that conditions may be accurately presented, the described apparatus is adapted for the digital measurement of conditions obtaining over extremely minute time periods, illustrative of which may be considered switching times in the range between a time period as short as one nanosecond to a microsecond or more (one nanosecond is equal to one millimicrosecond = $10^{-9}$ seconds).

The apparatus to which this invention is directed includes a fast rise-time pulse-generator circuit, the output of which is adapted to be applied to the component under test through a selected dynamic range. The output signal from the component is then supplied to a pair of voltage discriminators, one responding to a positive going wave form and the other responding to a negative going wave form. It is then possible to sense selected amplitude levels between which the response characteristic of the element is to be represented. Provisions are made for controlling the voltage or current level at which the discriminators function. Following this, suitable circuitry is provided to process the supplied signals to convert time information into analog form. Programming is carried out by suitable control circuitry. Digital representations of time measurement between selected amplitudes are obtained.

In accordance with the invention, as herein to be described, the component to be measured may be either inverting (as, for example, a transistor), or non-inverting (as, for example, a diode or a transformer).

When the device is functioning, the pulses originating in a suitable pulse generator of suitable character are supplied to the device under test at an appropriate rate. The device then responds to the input transient with the characteristic wave form over which time increments are determined and measured. Provisions are made for programming the discrimination points with the starting pulse being determined by the time of arrival of pulses from the pulse generator and the stopping pulse originating at a time coincident with the condition of the discriminating component desired for different test characteristics. For convenience of illustration and representation, the device herein to be considered will be described particularly with reference to testing of transistors, this being one illustrative type of component to which the operation is related.

Under the circumstances, the control pulse is usually supplied to the base of the transistor and from this pulse the delay time of response of the component to reach a 10% condition is represented; also the rise period representing the component characteristic between a 10% and a 90% operating range is depicted. Following such determinations and the termination of the exciting control pulse, the storage time of the component is represented by that period of time between the termination of the control pulse to the component base and its return to its 90% point of operation.

Lastly the fall and turn-off conditions are established with the fall time being that occupied while the component in cutting-off changes from its 90% response level to a 10% response level. The turn-off period is represented by a summation of the storage and fall time periods.

The response of the component under test is determined by pre-programming the discrimination points. Starting is originated by the supplied pulse and the operation is stopped under the control of the discriminator output reaching a pre-assumed response level in the component. The effect derived is then appropriately processed and converted to analog representations for each channel within the selection range. In the case the component to be tested happens to be a transistor, selection may be established for determining the N-P-N mode or the P-N-P mode. In the case of diodes, the plus and minus characteristics are determined by the polarity of the control signal pulse.

Other and further characteristics of the invention will become apparent from what is to follow in the description in which the apparatus is described in connection with the generalized form and by which specific components are set forth, including the preferred form of circuitry.

The invention, when so represented, is depicted by the following accompanying drawings wherein:

FIGURE 1 is a schematic block diagram showing the preferred operating form of the invention;

FIGURE 2 is a circuit diagram of a preferred form of commutating and timing control circuit;

FIGURE 3 is a circuit of the pulser supply;

FIGURE 4 is a circuit diagram of one form of collector supply circuit for the component under test;

FIGURE 5 is a circuit diagram of a typical installation of an amplifying unit for generating controlling signals, of which one controls the discriminator bias supply;

FIGURE 6 is a circuit diagram to show suitable control circuitry for determining the bias applied to the discriminator circuit;

FIGURE 9 is a circuit of a suitable test board for use in the control of the component under test and the discriminator;

FIGURE 10 is a circuit diagram of a typical form of current amplifying device;

Figure 7:
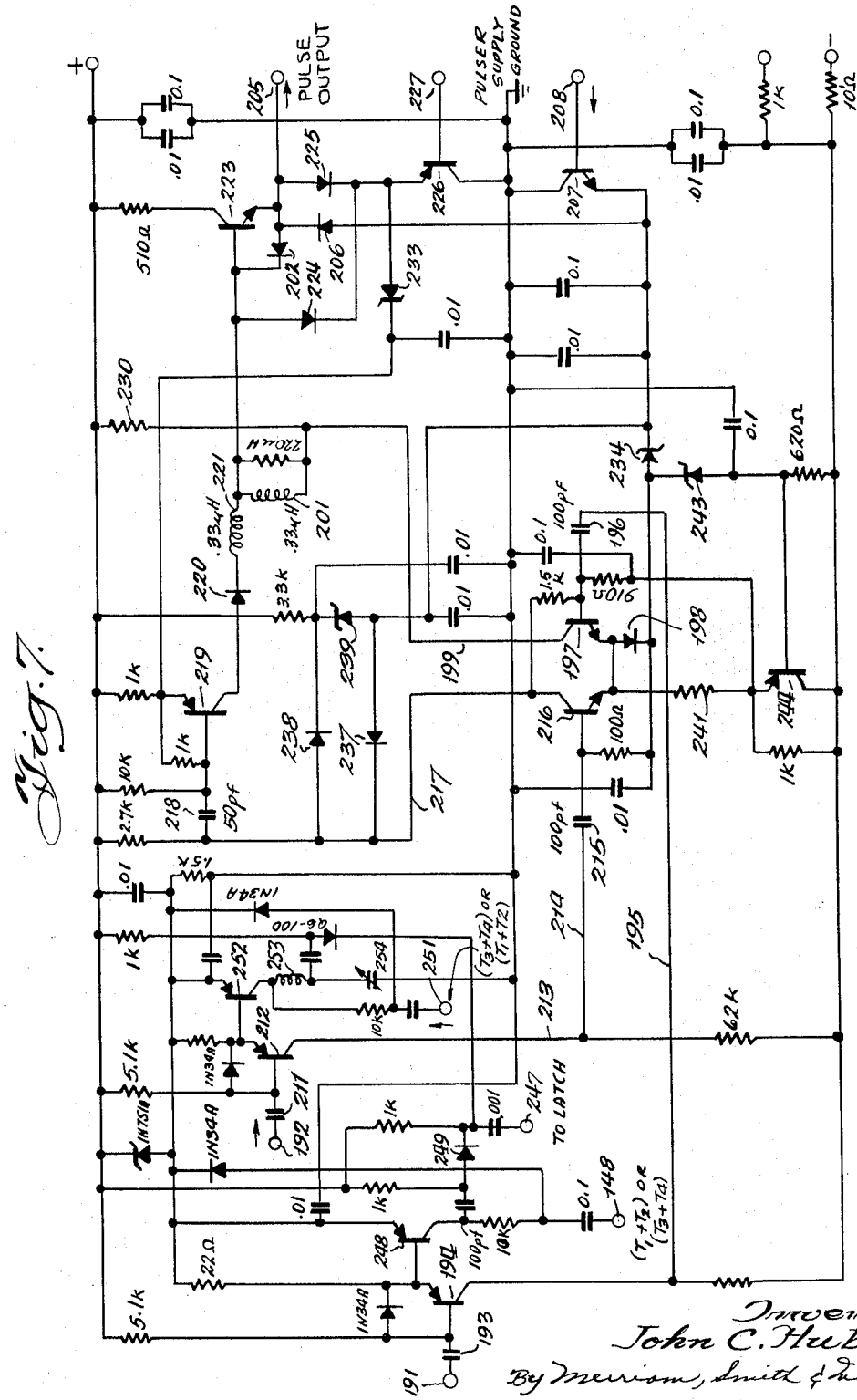
FIGURE 7 is a circuit diagram of a suitable voltage pulser and generator.

FIGURE 11 is a diagram of applied pulses serving in the control of various components or circuit parts as above described, the figure also showing the commutator timing periods by which four separate time periods, $T_1$ through $T_4$ are derived, and with which the relationship of the so-called clock impulses is depicted; and FIGURE 12 is a schematic representation of wave form of the control or base pulse signal applied to the component under test and the component output, the curve being indicative of a transistor as the component under test.

If reference is now made to the accompanying drawings for a further and more detailed understanding of the invention, it may be considered that the described circuitry is such as to provide for detecting discrete points of interest on the characteristic wave form of a component under test. In the preferred form of operation, a so-called tunnel diode is used as the controlling and discriminating component. Due to its ability to respond at high frequencies and also because of the substantial stability, this provides an opportunity to resolve extremely short time intervals which can accurately be repeated as desired. The circuitry provided utilizes the tunnel diode component completely externally to the component under test and in such a way as to make the component substantially free from external loading.

Referring now to FIGURE 1 of the drawings for a consideration of a preferred form of the apparatus, it may be assumed that the component to be tested is in the form of a transistor 11 having the usual base electrode 12, the emitter 13 and the collector 14. In the preferred operation, as hereby described, the emitter is grounded at 15. Under such circumstances, suitable pulses which occur with extremely steep wave fronts and which are regularly repeating are supplied to the base electrode 12 from a pulse generator 16. The pulse generator also supplies an output signal to the latching circuitry 17.

With the activation of the component 11 and the latching mechanism being concurrent, the pulse controls and starts a constant output in the latching circuitry 17 whose output is suitably applied to an integrating current amplifier 18. The application of the control pulse to the component 11 causes current to flow therethrough and, illustratively, it soon happens that the transient wave form at the collector 14 passes through the so-called 10% level on its way to approach a saturated level state. The component 11 is supplied with operating voltage from a collector supply 19. The output current connects across a load resistor 20 into a suitable tunnel diode discriminator circuit, conventionally shown at 21. The tunnel diode circuit is appropriately biased from the discriminator bias supply 22. The tunnel diodes provide output signals which are available on the conductor 23 to be applied to the latch 17 to limit its operating periods.

The instant the component 11 passes through the assumed 10% point, application of a signal representative thereof to the latch circuit 17 causes the latch to turn off. The result is that the integrating amplifier 18 has received an output current pulse from the latch which is of constant amplitude and of a duration proportional to the time difference being measured in the assumed situation. This, at the start, is the time known as "delay time," which means the time between the initiation of an input signal to the component under test and its reaching a 10% response level. This sequence of control is then repeated at a constant rate so that an output signal is available which is the analog voltage calibrated directly in time.

The operation, as above described, is repeated on sequential measurements in the case of a transistor as a component under test where measurements are made. Delay time ($T_d$) has already been mentioned. Turn-on time ($T_{on}$) is represented by the difference in response levels between the time of occurrence of the leading edge of the applied pulse at the base of the component and the 90% point on the collector response. The response time ($T_r$) is the difference between the turn-on and delay times.

Also, storage time ($T_s$) is represented by the period between the falling or trailing edge of the pulse applied to the transistor base 12 and its return to a 90% response at the collector. Lastly, the turn-off time ($T_{off}$) is determinable as represented by the time lapse between turn-off of the base pulse and the return of the component to the 10% collector level. Fall time ($T_f$) is the difference between turn-off and storage times.

Appropriate control of the discriminator bias supply 22 is achieved by a control supplied from the clock and communtator circuit 24 through the amplifier 25 to the discriminator bias supply 22. The generating circuitry then serves to bias to different levels the tunnel diode discriminator for each desired sequence whereby the tunnel diode component determines the selected point on the component wave form.

The same clock and commutator component 24 also distributes the output of the latch circuit 17 to an appropriate current amplifier for the individual channel amplifiers. From this circuitry the rise time is readily derived from the difference of the turn-on time point and the delay time.

In the reference to the foregoing, consideration may be given also to the curves of FIGURE 12 where the base pulse represented by curve ($a$) is applied to the base 12 of the component 11. The response of the component 11 for such pulse application reaches the 10% level at a time $T_d$, which occurs a short time following the initiation of the base pulse. The time within which the component under test reaches the 90% response level is indicated by the reference $T_r$. This condition occurs some time following the initiation of base pulse. It also can be seen that the base pulse in the diagram then produces a saturated response of the component. The drive pulse is terminated a short time prior to that at which the response level of the component drops. This condition is indicated by the storage time shown as $T_s$. The storage period continues to the time when the component response is reduced to its 90% level. Lastly, the fall period, represented by the legend $T_f$, follows the end of the storage period and is indicative of the time period over which the response of the component to the previously supplied activating pulse is reduced to its 10% level. Consideration of these significant factors is helpful to the general consideration of the operation.

With the foregoing generalized explanation, reference may now be made to the schematic circuitry of FIGURE 2, showing in particular the typical clock and commutator circuitry. This component provides the programming signals for the unit. It provides a pulse output at a selected frequency to determine the rate at which pulses from any suitable pulse generating component or by which any suitable pulses available from an external source are supplied to the component under test. In its broad formation, the generating circuitry divides a clocking and control period into four portions through the utilization of two binary circuits. The circuitry divides each clocking period of four pulses in such a way that the basic wave forms may be added and substracted to provide output pulses during each of four selected timing periods.

If it be assumed, for instance, that the clocking pulse occurs at the rate of 10 kc. per second, various pulses will occur at a repetition rate of 2.5 kc. with a duration of each pulse of 100 a microsecond duration. In this operation the primary control is established by the oscillatory circuit provided by a transistor component 31 having a parallelly tuned inductive and capacitative circuit 32 connected to the collector thereof. Operating voltages are provided by way of the source (not shown) connected with its negative terminal at point 33 and its opposite side grounded at 34. The collector is supplied with operating voltage through the tuned circuit and the base through the base resistor. The emitter is grounded as indicated.

Output signals or voltages developed by the oscillator 31, as tuned by the circuit 32, are supplied by way of the connection to the emitter of transistor 31 through the capacitor 35 to the base of the grounded-emitter amplifier 36. Output signals derived from the amplifier 36, whose operating potentials are supplied by the indicated connections, are then fed through the resistor 37 to the output terminal 38 to connect there to the amplifier circuitry (see FIGURE 5). The positive going operation of the signal wave form, diagrammatically indicated and available at the collector of the amplifier 36, is also coupled and supplied through the capacitor 40 to a multi-vibrator circuit of generally known form, represented by the transistors 41 and 42. The multi-vibrator formed to include transistors 41 and 42 is essentially a standard Eccles-Jordan flip-flop circuit operating in the saturated mode with the complementary input to the collectors being through the diodes 44 and 45.

Transistor components 47 and 48 operate essentially as saturating amplifiers and provide the output signals which are supplied to the indicated matrixing circuits.

The positive input signal from the transistor 41 of the multi-vibrator, as derived at its collector, is supplied by way of conductor 49 and the capacitor 50 to the diodes 51 and 52, from them to drive and control a second multi-vibrator or flip-flop circuit comprised of transistors 53 and 54. The transistor multi-vibrator circuit, as can be seen, is substantially identical to that provided by the transistors 41 and 42. When the output of the multi-vibrator is supplied through the saturating transistor components 57 and 58 suitable signals are available for supply to various output terminals 60, 61, 62 and 63, as will now be described to provide the pulses occurring at the assumed 10 kc. rate already discussed.

The two flip-flop circuits comprising transistors 41 and 42 on the one hand, and 53 and 54 on the other hand, divide the output of the oscillator 31 which here may be assumed to be 10 kc. for illustrative purposes in binary fashion. In this respect, the output from the saturating amplifiers 47, 48, 57 and 58 is then decoded by means of the various resistors 65, 66, 67 and 68 and the diodes 70 through 77 to produce four time intervals, each of equal duration and spaced with respect to each other, as depicted by FIGURE 11.

Under the circumstances, the impulses designated $T_1$ through $T_4$ are developed respectively at the terminals 60 through 63. In this form of the apparatus, the impulses which are available at the terminal 60 are supplied to a like numbered terminal input point in the operation of the circuit diagram shown by FIGURE 5. Similarly, the outputs at terminals 61, 62 and 63, respectively, are also available at the input terminals of like number in FIGURE 5. For these operating conditions, as here described, the pulse polarity at the terminal 60 will be negative only when the transistor 58 is turned off simultaneously with transistor 47 turn-off. Under these conditions, the resistor 68 causes the terminal point 60 to become negative by a pre-selected amount. For these conditions and with the assumed frequency, terminal point 60 becomes negative for 100 microseconds, which is followed by a time period of 300 microseconds when it becomes positive. Similarly, and by following similar considerations, terminal points 61, 62 and 63 will have a wave-form like that available at the terminal point 60 except with the time delay as indicated by FIGURE 11.

If reference is made now to FIGURE 3 of the drawings, and with the assumed diagrammatic showing of FIGURE 1 in mind, the pulser supply 26 is connected so that the voltage of a suitable value is supplied at the terminal point 81, which here may be assumed illustratively as +20 volts. This voltage is referenced to the Zener diode 82 and maintained by the amplifier 83 and its associated series regulator transistor 84. Similarly, the −20 volt supply (referring to the same generalized example) is applied at the terminal 85 and is referenced to the positive voltage supply through the resistor 86. The transistor 87 constitutes a feed back amplifier and with transistor 88 constitutes a series regulator for the negative voltage supply. Negative pulses which appear at terminal 91 (as developed in the clock and commutator circuit of FIGURE 5 as the output of the corresponding number terminal) and are supplied through the capacitor 92 to the base of transistor 93. At this time the positive pulse appearing at the collector electrode of transistor 93 is then supplied through the capacitor 94 and the diode 95 to control and trigger the operation of a one-shot multi-vibrator combination provided by the transistors 96 and 97 which together serve to determine the width of the pulse generator output as will be described in connection with FIGURE 7 in particular.

Under normal conditions, the multi-vibrator formed from the transistors 96 and 97 is non-saturating with the transistor 96 maintained in a conductive state by way of the resistor 98 and diode 99. However, when a positive pulse is applied through the diode 95 which connects to the diode 99 (cathode-to-cathode), the transistor 96 is rendered inoperative or turned off, which then permits the transistor 97 to conduct or to be turned on.

Feed back and regeneration is provided through the coupling capacitor 101 back to the base of the transistor 96. For these conditions, the one-shot multi-vibrator combination will then remain in a timing state for a period which is determined by the time constant established by way of the capacitor 101 and the resistor 98. The result is that the two wave forms which are developed and which appear at the output of the collector electrodes of transistors 96 and 97 are coupled through resistor 102 for transistor 96, and resistor 103 for transistor 97, to output terminals 104 and 105, respectively. Illustrative wave forms are shown adjacent to these terminals.

At times when the one-shot multi-vibrator is triggered into its timing state, the terminal point 105 is made positive, while at the same time the terminal point 104 is negative. At the end of the timing state the reverse condition occurs, so that the mode selection reverses the polarity, depending upon whether or not the so-called P-N-P or N-P-N operation is desired. The remaining components depicted by this figure need not be discussed in detail at this point of the description.

Reference may also be made now to FIGURE 4 of the drawings, wherein typical showing is made of collector supply voltage in a schematic operation. In FIGURE 4, the ground connection is made at terminal 115 with voltages assumed (illustratively) at +20 v. and −20 v. respectively applied at terminals 116 and 117. In this form of the operation, terminals 118 and 119 respectively provide collector supply voltages of negative and positive value at selected levels. The diodes 120, 121, 122 and 123, respectively, provide unregulated voltages for the collector supply. In this showing, the terminal points 125 and 126 respectively are connected to appropriate filter capacitors (not shown) of a filter network.

The collector supply provides both positive and negative voltage. In the diagram form, the positive supply is provided through the feed back amplifier 127 and a series connected transistor 128 serves as a regulator. The voltage available at the positive supply 119 is determined by the voltage at the base of the transistor 127 which is connected to the terminal 129. The connection is made so that the base of the transistor 127 swings from ground to +20 volts for the illustrative example, and the clamping diode 131 prevents the positive supply from going negative with respect to ground.

Considering now the negative supply, it will be observed that this is referenced to the supply through the resistor 132 which is connected to the base of the feed back amplifier 133. In this arrangement the transistor 134 serves, as does the transistor 128, as a series regulator with the transistor 133. The resistor 135 is connected, as can be seen, to the base of transistor 133 and to the terminal 117, to provide a voltage offset so that the negative supply will precisely track the positive supply. In the arrangement shown A.C. voltage of a predetermined level is applied to the pins or terminals 138 and 139, and thence to the conductors 140 and 141 after rectification through the diodes 120 through 123, inclusive.

Certain unregulated voltages of 20 and 40 volts respectively for the circuitry shown may be provided, but these are generally of known character and have not herein been specifically diagrammed. However, it may be understood that unregulated voltage can be supplied as desired and stabilized through the use of appropriately connected Zener diodes or the equivalent.

If now reference is made to FIGURE 5 of the drawings, input voltages as represented at the terminals 60 through 63 of the clock and commutator circuitry of FIGURE 2 are applied at similarly identified input terminals of FIGURE 5 showing from top to bottom at the left of the figure the input 60, 61, 62 and 63.

For conditions when the input pulse, available at the input terminals 60 or 61, are negative, it will be apparent that the base of transistor 141 will be driven negative through either resistor 142 or resistor 143. Under such conditions, the transistor 141 will be carried to a conductive state and its collector electrode will be near a ground potential during such time intervals. The time intervals will be found to be designated schematically as the times $T_1$ and $T_2$, as shown by the timing curves of FIGURE 11. The time intervals corresponding to times $T_3$ and $T_4$ or $T_2$ and $T_3$ or $T_1$ and $T_4$ are generated respectively by the voltages appearing at the input terminals and controlling respectively the conductive periods of transistors 144, 145 and 146 for the three stated conditions. Illustratively, transistor 144 is rendered conductive during the time intervals when the pulses $T_3$ and $T_4$ are available. Similarly, transistor 145 is rendered conductive at time periods when pulses $T_2$ and $T_3$ are available at input terminals 61 and 62. Lastly, transistor 146 is rendered conductive when pulses such as $T_1$ and $T_4$ are available at the input terminals 60 and 63.

The output pulses are derived across the load resistors connected to the transistor collectors and to the negative input terminal 148, so that at terminal point 149 a voltage is available representative of the condition $T_1+T_2$. At terminal 150 a voltage is available representative by the pulses $T_3+T_4$. Terminal 151 provides a voltage representative of the condition for pulses $T_2+T_3$, and lastly, terminal 152 provides pulses indicative of the condition $T_1+T_4$.

It was above noted that the pulses available at the terminal 38 (see FIGURE 2) are supplied at terminal 38 of FIGURE 5. At times when the signal voltage available at this input terminal is carried positive, the binaries on the commutating circuitry are being switched, and at this time the collector electrode of the transistor 153 is carried negative to the voltage of the input terminal 148; and secondly, there is not output from the transistor 154. At such times as the base of the transistor 153 is carried negative, the collector electrode of this transistor is positive and the result is that a negative pulse is made available at the collector output and at the terminal point 91. This negative pulse is then supplied as a triggering pulse to the pulse generator as already described in connection with reference above made to FIGURE 3.

Figure 6:
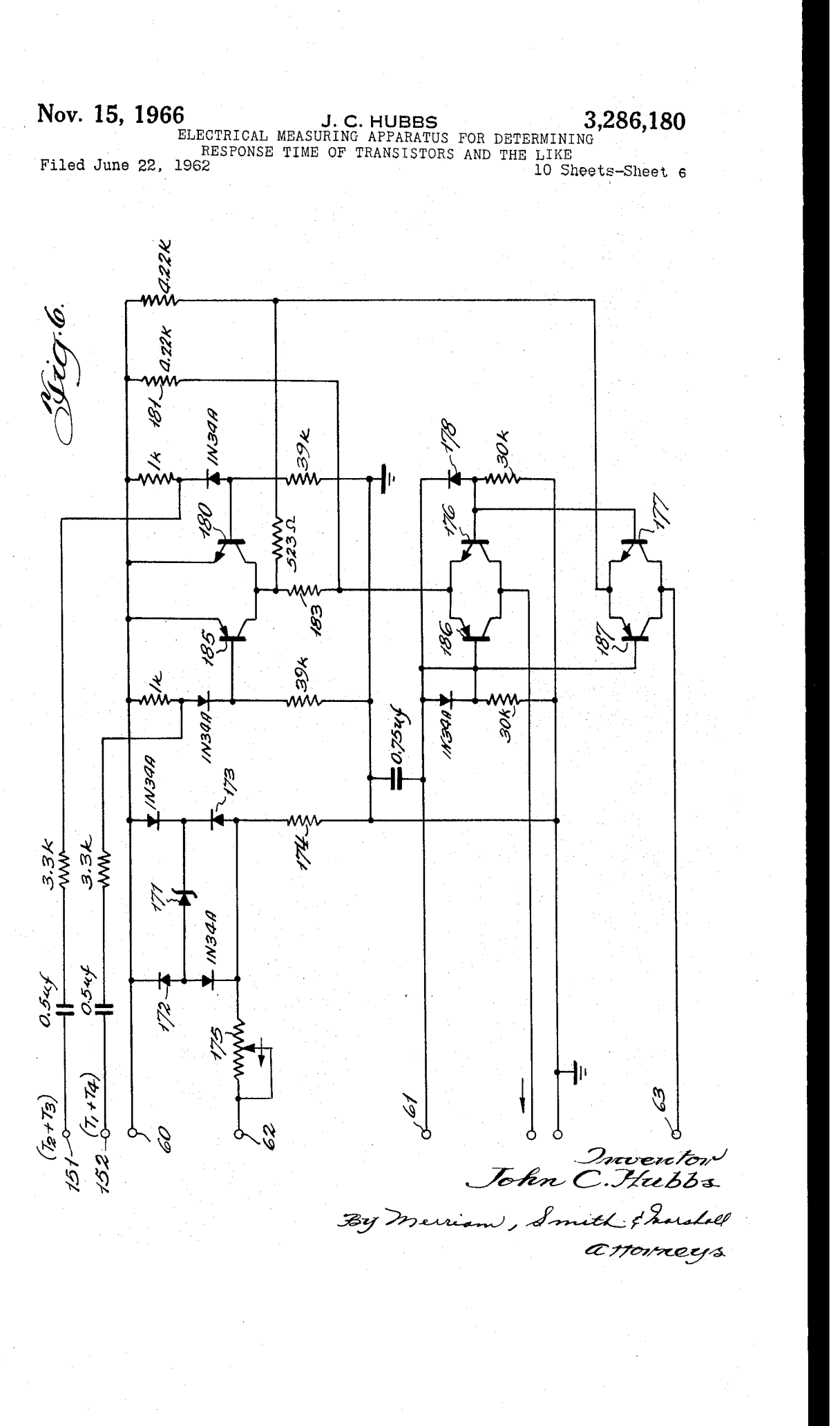

Reference may now be made in more detail to the circuit of FIGURE 6 and it may be assumed illustratively that the mode switch is connected in the P-N-P position so that, for the illustrated condition, negative voltage is applied at the terminal point 60. For this state of operation, current for the Zener diode 171 will then flow through the diodes 172, 173 and the resistor 174 to ground. A voltage of appropriate negative value is then applied to one end of the potentiometer 175 (which illustratively may be a unit of the type known as a Helipot or the Bourns trimpot) which connects to the terminal point 62 providing the bias supply. Under these circumstances terminal point 61 connects to the bases of transistors 176 and 177, respectively, through the diode 178 so that the base is carried between two negative voltages depending upon the setting of the potentiometer 175.

During the timing period represented by $T_1+T_4$ (that is the signal available at terminal 152; see for instance FIGURE 5), and also available at the same numbered terminal in FIGURE 6, the signal voltage which is available at the terminal 151 is sufficiently negative to bias transistor 180 to an "off" state. Under the circumstances, the current flow through the transistor 176 is determined by the resistor 181 connecting to the terminal point 60 and to the emitter of the transistor 176, with the transistor base then being subjected to the so-called swing potential supplied at the terminal 61. This then determines the operational point of the tunnel diode discriminator with the transistors 176 and 177 providing the bias currents for the negative and the positive tunnel diode discriminators. For a given mode of operation, i.e. P-N-P or N-P-N transistors, the source of the bias current provided to the two tunnel diodes is the same, i.e. both $T_d$, and will have either a negative or a positive bias current.

For the time periods $T_2+T_3$ the supplied signal at the terminal 151 is in the positive sense. This causes the transistor 180 to conduct and thus control the current flow through the transistor 176 with the indicated connection through resistor 183 between the collector of transistor 180 and the emitter of the transistor 176. This sets the so-called 90% point of discriminator bias provided to the tunnel diode. The resistors 181 and 183 are usually made of close tolerance and in such proportion that the current flowing through their parallel combination, when the transistor 180 is conducting, is, for the illustrated example, nine times that flowing when the transistor 180 is biased to a non-conducting or "off" state. This condition and feature then automatically tracks the 10% discrimination point when the 90% point has been adjusted. The combination of the transistors 185, 186 and 187 functions in a fashion similar to that described for transistor 180, 176 and 177.

The transistors 185, 186 and 187 are non-operative for conditions where the mode switch is in the P-N-P position. However, when the mode selection is changed to the N-P-N state, a positive voltage is applied at the terminal 60 and all of transistors 180, 176 and 177 become inoperative. The timing signal applied at the terminal 152 is opposite in phase to that which is available at the terminal 15. Consequently, the transistors 185, 186 and 187 determine the appropriate bias currents with current flow therethrough. All the polarities are then reversed with respect to the conditions particularly set out with respect to the transistors 180, 176 and 177.

Referring now to FIGURE 7, particular reference is made to the voltage pulse generation. This circuit provides the basic driving pulses to the component 11 (see FIGURE 1) which is under test. The control may be provided as either a current or a voltage pulse generator and in either case the rise and fall times are extremely fast. Usually, it is desirable in the circuit operation to use components which are of the type known as avalanche transistors, because of their rapid response. In the operation, for convenience of reference, it will be assumed that the repetition rate of the pulses is at a 10 kc. per second rate with the pulse widths being 10 microseconds. Under the circumstances, the component under test will be operated and controlled with the 10% duty factor. The voltage pulser herein to be described is adapted to receive control voltage pulses from the amplifier, as particularly shown and described by FIGURE 5. This determines whether the starting pulse which is applied to the latching circuit 17 is transmitted on the leading or the trailing edge of the base drive pulse. For the determination of delay and turn-on time for the component under test, the considerations are based upon the lead or forward edge of the driving pulse, whereas it will be appreciated the storage and turn-off time measurements are commenced with the determination of the arrival of the falling edge of the driving pulse. This is exemplified particularly by the curves of FIGURE 12 where the fast rise of the base pulse coincides with the initiation of the time period $T_d$ and the sharp cut off or controlling time of the base drive pulse coincides with the starting of the storage period shown at $T_s$.

Considering now more particularly the showing of FIGURE 7, this description will proceed on the basis that a negative pulse is utilized to drive the base 12 of the component 11 under test when operation is in the P-N-P position. For these conditions, pulse supplied at the terminal 191 originates at terminal 104 of FIGURE 3. The negative pulse applied to terminal 191 is then coupled through coupling condenser 193 to the base of the avalanche transistor 194, and applied from its collector electrode through conductor 195 and capacitor 196 to the base of transistor 197. There is a diode 198 which connects to the emitter electrode of transistor 197. The diode permits the transistor 197 to conduct a heavier current during so-called avalanche pulse periods and thereby produce a fast rising negative pulse at the collector which is then supplied by a conductor 199 to the inductance 201. The connection couples the output from transistor 197, by way of the diode 202, to the pulse output terminal 205. This output pulse is then clamped from going more negative by the control provided by the clamping diode 206 which is connected to the emitter electrode of transistor 207. Transistor 207 has its base connected through terminal 208 to a variable voltage which through transistor 207 and diode 206 determines the negative amplitude of the pulse. Turn-on control may be provided through any suitable connection such as a potentiometer (not shown).

When the multi-vibrator signal from the pulser supply, available at the terminal point shown by 105, FIGURE 3, ends its timing state, it will go negative and this signal is then coupled through the capacitor 211 to the base of the avalanche transistor 212. The output from the collector electrode of transistor 212 is supplied by way of conductors 213 and 214 through the coupling condenser 215 to the base of transistor 216. The combination of the transistors 216 and 197, as connected, sets up essentially a bi-stable multi-vibrator.

Whenever the transistor 216 is in a conductive state it changes the operational state of the formed multi-vibrator circuit. The negative going signal from the collector electrode of transistor 216 is coupled through the conductor 217 and coupling capacitor 218 to the base of transistor 219. The collector signal of transistor 219 is supplied through a diode 220 and the inductance element 221 to the base of the emitter-follower transistor 223. This produces at the output terminal 205 a positive going falling edge of the output pulse available. The transistor 223 is clamped by the diode elements 224 and 225 functioning in conjunction with transistor 226. The clamp functions in such a way that after the positive going edge of the pulse, the base of transistor 223 is held against the positive clamp by the resistor 230. With the mode switch in the assumed position, the base of the positive clamp transistor 226 is connected at the terminal 227 to the swing element of the turn-off control helipot.

The emitter of the transistor 219 is held at an assumed relatively low positive voltage with respect to the positive clamp voltage by means of the Zener diode 233. Another Zener diode 234 determines the voltage across the transistors 216 and 197. When the transistor 197 is conducting, its collector is held to the negative clamp by the diodes 202 and 206. At such times as the conduction carries through the transistor 216, its collector is kept from going more negative than the negative clamp voltage by the diode 237.

The collector of transistor 216 is prevented from going more positive than a pre-established amount (such as five volts, for instance) above the negative clamp voltage by the diode 238 of Zener diode 239. Current through transistors 216 and 197 is determined by resistor 241 and the Zener voltage of Zener diode 243. The transistor 244 is connected as an emitter-follower and is referenced to the Zener diode 243.

Figure 8:
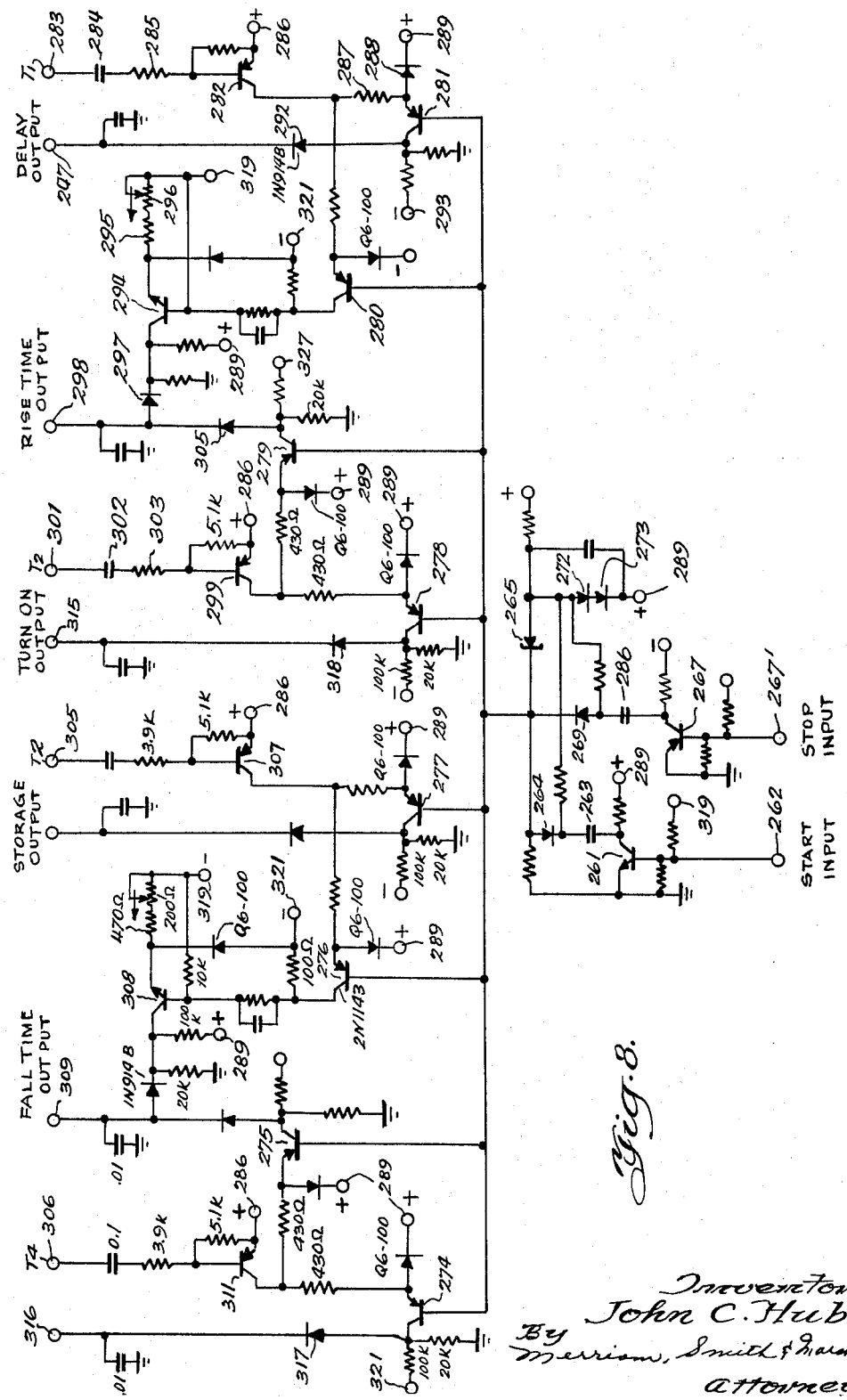
FIGURE 8 is a circuit diagram of the latching circuitry controlled from all of the generated pulses supplied to the component, the discriminator output and the timing and clocking mechanism.

The starting pulses to the latching circuitry 17 as disclosed particularly by FIGURE 8 are made available at the terminal 247 and pulses from the amplified device (see FIGURE 5) are applied at the input terminal 148 of the voltage pulser unit of FIGURE 7. Under these conditions, during the time intervals $T_1$ or $T_2$ when delay time is measured or the turn-on time is measured, the collector electrode of the transistor 248, which connects with its base tied to the emitter of the transistor 194, is driven negative and a positive voltage is then coupled through the diode 249 to the terminal point 247, providing a starting pulse to the latch circuit.

At times when the storage and turn-off periods of the component under test are being measured, the collector electrode of the transistor 248 is positive and at a potential approaching that of the emitter. At times when the transistor 194 is triggered, no pulse will be produced at the collector of transistor 248. Similarly, when the time interval signal becomes available at the terminal point 251 and determines the potential at the collector of the transistor 252, the proper starting pulses to the latch circuit of FIGURE 8 are developed in order to measure storage and turn-off times. There is, however, a delay of the starting pulses from the transistor 252 introduced through the action of the inductance 253 and the series connector capacitor 254. This delay period compensates for the added delay which the positive going leading edge of the pulse experienced by reason of the transistor 219 as an amplifying component. Whenever a positive going pulse is required for a so-called N-P-N type of operation, the signals to the terminals 191 and 192 are reversed as are the signals at the terminals 148 and 251. Likewise, the turn-on and turn-off potentiometers connected to the base electrodes of the transistors 226 and 207 are reversed.

At this point it is desirable to consider the latch circuitry as shown by FIGURE 8. In this operation, when a positive starting pulse is provided to the base of transistor 261 by way of the terminal point 262 at which potential is derived from the terminal 247 of the pulser, the collector electrode of the transistor 261 is carried negative and the pulse is coupled through the capacitor 263 and the diode 264 to the cathode element of the tunnel diode 265. The voltage which appears across the tunnel diode 265 then becomes negative with the assumed operating conditions by about 0.75 volt.

The tunnel diode 265 will remain in this so-called "on" position until a negative "stop" pulse is applied to the base of transistor 267 by way of the input terminal 267'. The positive pulse from the collector electrode of the transistor 267 is then supplied by way of the capacitor 268 and the diode 269 to render the tunnel diode 265 non-conducting. The anode element of the tunnel diode 265 is referenced to a positive terminal point 289 through the two series connected diodes 272 and 273. There is a voltage drop carrying across the series connected diodes 272 and 273 which provides a turn-off bias for each of the transistors whose base electrode is connected to the cathode of the tunnel diode 265, which includes consequently each of transistors 274 through 281, inclusive.

In the operation during the time period $T_1$ during which a delay time $T_d$ is being measured, the base of transistor 282 is driven negative by a control pulse in the form of a commutating signal $T_1$ supplied at the terminal 283 which is coupled through the capacitor 284 and through the resistor 285 to the base of transistor 282. It can be observed that the transistor 282 has its emitter electrode connected to a terminal point 286 which is maintained at a positive potential. At the time the transistor saturates, there will then be a determinable current flow through the resistor 287 and the clamp circuit provided by the diode 288 which connects to the terminal point 289. For times when the latch circuit is caused to operate and assume a "delay" position, the transistor 281 is also turned on and the current flow through the resistor 287 then passes through the transistor 281 and the diode 292 to the current amplifier input. The transistor 281 then provides this constant current available at the terminal 247 until such pulse turns the latch circuit to an "off" position.

In addition, at the time period $T_1$, the transistor 280 is also carried to a conducting state. The negative collector current of transistor 294 is determined by flow through the resistor 295 and the series connected potentiometer 296. The current is applied through the diode 297 to the rise time current amplifier and made available at the output terminal 298.

During the next portion of the time cycle, namely, time period $T_2$, during which the turn-on time is measured, the transistor 299 is turned on by the timing signal available at the input terminal 301 represented as $T_2$. This signal is applied through the capacitor 302 and resistor 303 to the base of transistor 299 in the usual fashion. Whenever the latch circuit is turned on during such a time interval $T_2$, the transistor 279 will also be carried to an "on" position. Positive current flowing through the transistor 279 is then available through the diode 305 and supplied to the rise time current amplifier at the terminal 298. The net current flow to the rise time current amplifier terminal point 298 is the sum of the turn-on current derived from the conductor periods of the transistor 279 minus the delay time current as determined by the current flow through the transistor 294.

Following the principle hereinabove outlined, it will be appreciated that similar controls are provided by the circuitry of FIGURE 8 to control the different assumed measuring periods. With the pulse $T_1$ being supplied at terminal 283, $T_2$ at terminal 301, the pulses $T_3$ may be applied at terminal 305 and pulses $T_4$ at terminal 306. With the operation following the conditions hereinabove explained and with the transistor 307 being connected to transistor 277 in a fashion similar to the connection made between transistor 281 and transistor 282 and transistor 276 being similarly connected to the connection shown by transistor 280 and associated with transistor 308 in a fashion similar to that described for the connection of transistor 294 to the transistor 280 of the diode 297 and thence to terminal 298, there can be obtained at the terminal point 309 an indication of the fall time output in contrast to the rise time output available at terminal 298. Also, it will be noted that transistor 274 is connected generally similarly to the connection shown for transistor 278 and likewise that transistor 275 is connected similarly to the transistor 279. In the form of circuit shown to the left of FIGURE 8, the transistor 311 is connected similarly to the connection for transistor 299, and for these conditions, turn-on output signals are available under the control of a current flow through transistor 278 connected to the terminal point 315, and turn-off output signals are made available at the terminal point 316 as determined by the current flow through transistor 274, each of transistors 274 and 278 supplying the output terminal point through the indicated diodes 317 and 318. Due to the similarity of the operation and for simplification, only general reference is made to this operation of the circuit. The clamps already described are similar in each operation of the circuit.

Reference may be made at this point to certain terminal connections which are marked 286, which terminals illustratively represent a point of application of positive potential for the assumed condition of +20 volts. At the terminal points marked 289, a positive potential of a lower value, illustratively about +10 volts, is made available. At the terminal points marked 319, negative voltages approximately equal to the highest positive voltage are also applied, and at terminal points 321, the lower of two negative voltages is applied.

Lastly, the output from the latching circuitry is appropriately connected. In this showing, the input to the current amplifier (FIGURE 10) is a positive voltage, available on the conductor 331 which is connected to control the grid potential of an amplifier tube 332, which tube illustratively may be of the type known as the CK 5886. Suitable plate for anode voltage on this tube is provided by way of the tube load resistor 333 connected to the conductor 334 which in turn connects to the positive terminal point 286. The plate of tube 332 also connects to the base of transistor 335 which, with current flow through the tube, carries the base to a negative potential with respect to its previous state, a collector on transistor 335 connects to the base of transistor 336 to drive this transistor more positive and causes collector electrode thereof to conduct more negatively. The collector of the transistor 336 connects through conductor 337 and resistors 338 and 339 to various resistors 339 through 343 of the range switch. The feed back amplifier reaches an equilibrium state when negative voltage from the collector of transistor 336 is of such value that the negative current through the range resistors 339 through 343 is equal to the positive input current from the latch circuit as shown by FIGURE 8. Offset current is determined by the resistor 345 and the setting of the swinger of the potentiometer 346. The input current supplied in the conductor 331, which is combined with the feed back through the range switch so that output from the current amplifier which goes through the switch and to the output connectors is derived from the collector of the transistor 336 through the resistor 349 and the setting of the potentiometer 351 which provides the desired scale factor. The capacitors indicated shunt the resistors of the range switch and determine the timing constant thereof. The Zener diode 353, together with resistors 354, 355 and 356, provide a feed back circuit to cancel out the variations which otherwise might be introduced due to the fluctuations of voltage on the supply lines for conductors 286, 319 and 321.

When the apparatus described herein is in use, and illustratively testing the P-N-P connected transistors, the tunnel diode 375 of FIGURE 9 is used to determine the two significant points, namely, the 10% level and the 90% level, on the leading edge of the collector waveform. The tunnel diode 376, as shown by FIGURE 9, serves to determine the storage and turn-off times. In circuit operation, the tunnel diode 375 serves as a positive discriminator and is back-biased. This, of course, makes it apparent that the tunnel diode 376, which serves as the negative discriminator, will be forward-biased. The bias for the discriminator 375 is applied at terminal 377, while bias for discriminator 376 is applied at terminal 378.

Transistor 379, associated with diode 375, is turned off when the tunnel diode 375 is back-biased. This results in positive current flow through resistors 380 (tapped to the desired tapping point), 381 and 382, as well as through the inductance 383, and enters into the tunnel diode 375, the connection to the resistor 380 having been made through a positive potential terminal 384. The current flow is set by the adjustment of the tapping point on the potentiometer (resistor) element 380 so that it is just equal to the peak current of the tunnel diode 375. Under such circumstances, whenever the collector electrode of the P-N-P transistor is under test, shown at 11, and supplied at its base 12 from the pulse source connected at terminal 387 (assumed to be connected to the pulse generator 16 of the type shown by FIGURES 1 and 7) the current which flows through the resistor 388 is equal then to the negative bias current flowing through the resistor 389. The tunnel diode 375 switches to its forward conducting state, and the positive voltage change across tunnel diode 375 causes transistor 391 to conduct, which then causes transistor 392 to conduct. The output at the collector of 352 is supplied through primary 394 of transformer 395 to the secondary winding 396 and thence to terminal 397 from which point the pulse is supplied through the conductor 23 (see FIGURE 1) to serve as a conrtol for the latch circuit 17. The transformer 395 inverts the positive pulse available at the collector of transistor 392 to supply it as a negative pulse or a "stop" pulse in the latch circuit 17.

After the tunnel diode 375 has switched and initiated the "stop" pulse, the tunnel diode connects in a forward direction under which conditions transistor 379 becomes conducting. The current flowing through the tunnel diode at this state is then determined by the resistors 401 and 402, the latter being in the nature of an adjustable potentiometer. The adjustment of the tapping point on 402 is set so that the current flow is essentially equal to the valley current of the tunnel diode 375. With this condition of operation the current from the transistor 11 under test then returns to a zero value and the tunnel diode is again back-biased. At this time, transistor 379 is cut off and the back-current flow to the tunnel diode makes it ready for the next cycle.

At times when the transistor under test is in the non-conducting state, the negative discriminator tunnel diode 376 is biased in the forward direction by the negative discriminator bias current supplied at terminal 378. At such time, the transistor 404 becomes conducting and valley current flows through the tunnel diode 376. If now the transistor under test is turned on or returned to a conducting state, the negative discriminator tunnel diode 376 switches to its reverse condition. Transistor 404 then turns off and peak current flows into tunnel diode 376. When the transistor under test is again turned off by the trailing edge of the pulse source connected at terminal 387, the collector of the transistor under test, 11, starts falling toward the non-conducting state. Under such conditions, when the current falling through resistor 409 (R1108) reduces to be equal to the bias current flowing through terminal point 378, the tunnel diode 376 switches to its forward conducting state causing transistor 405 to conduct. At this time the collector electrode of transistor 405 produces a positive pulse at the base of transistor 406 which, through the collector electrode thereof and the diode 407, produce through the winding 408 of the transformer 395 a pulse which will serve to provide a turn-off pulse of the time measurement by reason of the signal made available. It will be noted that the connections to the transistors 404 and 405, respectively, complement those made to transistors 379 and 391 and the operation, it is believed, need not be further discussed.

It is pointed out that when N-P-N transistors are tested and the characteristics thereof are measured, the discriminator bias currents are positive and consequently the negative discriminator tunnel diode 376 operates to discriminate on the leading edge of the transistor under test rather than on the trailing edge. Conversely, the tunnel diode 375 operates to discriminate on the trailing edge of the collector wave-form of the transistor under test and produces at the terminal 397 the controlling pulses for operating the latch circuit connected at the terminal point 397.

The foregoing has illustrated the invention in one of its preferred forms. Of course, within the spirit and scope of what has herein been shown and described various modifications may be made. It is therefore believed that the disclosure and the claims to follow should be interpreted in the light of what has been set forth and not limited beyond those limitations necessitated by the state of the existing art.

Having now described the invention, what is claimed is:

1. Apparatus for determining characteristics parameters of electrical components, comprising means for supplying repetitive electrical input signal pulses having a predetermined pulse repetition period to the electrical component under test, discriminating means connected to said component and serving to generate an output signal when the signal output of said component reaches a predetermined value, a latching means connected to receive the input signal and the output signal from the discriminator, said input signal serving to turn on the latching means to provide a constant amplitude signal and said discriminator output signal serving to turn off the latching means and terminate such signal to form a pulse of predetermined amplitude, means connected to said latching means responsive to said pulse of predetermined amplitude serving to provide a signal proportional to the average value of said pulse of predetermined amplitude over said predetermined repetition period, such signal also being proportional to the period during which the latching means is turned on.

2. Apparatus for determining characteristic parameters of electrical components, comprising means for supplying electrical input signal pulses to the electrical component under test, discriminating means connected to said component and serving to generate first and second output signals when the signal output of said component reaches first and second predetermined values, latching means connected to receive said input signal pulses and the output signals from the discriminator, such latching means comprising a first portion and a second portion, said two portions of said latching means being turned on by input signal pulses, one of said output signals of said discriminator turning off a first portion of the latching means and the other of said output signals from said discriminator turning off a second portion of said latching means, said latching means providing a first signal having a period equal to the period of time during which the first portion of the latching means is turned on, and a second signal having a period equal to the period of time during which the second portion of the latching means is turned on and integrating means coupled to said latching means for obtaining the difference between said two time periods.

3. Apparatus as in claim 2 in which commutating means are provided for switching between said first and second portion of said latching means.

References Cited by the Examiner
UNITED STATES PATENTS

| | | | |
|---|---|---|---|
| 3,041,537 | 6/1962 | Cagle | 324—158 |
| 3,074,017 | 1/1963 | Sunstein et al. | 324—158 |
| 3,082,374 | 3/1963 | Buuck | 324—73 |
| 3,179,883 | 4/1965 | Farrow | 324—73 |
| 3,197,700 | 7/1965 | Schwartz | 324—158 X |
| 3,201,690 | 8/1965 | Embree | 324—158 |

OTHER REFERENCES

IBM Technical Disclosure Bulletin (Scray), Automatic Rise Time Measurement, vol. 2, No. 6, April 1960, page 47.

"Production Method for Meas. of Rise, Fall, and Storage Time" (Paterson), Nov. 16, 1961.

WALTER L. CARLSON, *Primary Examiner.*

E. L. STOLARUN, *Assistant Examiner.*